United States Patent [19]

Schmidt et al.

[11] Patent Number: 5,433,417
[45] Date of Patent: Jul. 18, 1995

[54] VEHICLE MOUNTING BRACKET FOR A MIRROR ASSEMBLY

[76] Inventors: William P. Schmidt, 21000 Woodruff, Rockwood, Mich. 48173; Franklin D. Hutchinson, 28000 Beel Rd., New Boston, Mich. 48164

[21] Appl. No.: 92,516

[22] Filed: Jul. 16, 1993

Related U.S. Application Data

[63] Continuation-in-part of Ser. No. 843,508, Feb. 28, 1992, abandoned, which is a continuation-in-part of Ser. No. 419,213, Oct. 10, 1989, Pat. No. 5,106,049.

[51] Int. Cl.⁶ .................................................. B60R 1/00
[52] U.S. Cl. .................................. 248/487; 248/316.5; 296/152
[58] Field of Search .............. 248/487, 476, 475.1, 248/74.3, 231, 534, 539, 540, 541, 316.5; 24/543, 487; 296/152; 359/844, 871, 872, 874

[56] References Cited

U.S. PATENT DOCUMENTS

| | | |
|---|---|---|
| 1,905,623 | 4/1933 | Dietz . |
| 3,332,731 | 7/1967 | Penk ............................ 359/872 |
| 3,667,718 | 6/1972 | Goslin et al. . |
| 3,729,163 | 4/1973 | Cummins . |
| 3,778,016 | 12/1973 | Gernhardt et al. . |
| 3,833,198 | 9/1974 | Holzman . |
| 3,857,539 | 12/1974 | Kavanaugh . |
| 3,906,592 | 9/1975 | Sakasegawa et al. . |
| 3,976,275 | 8/1976 | Clark . |
| 4,030,692 | 6/1977 | Szilagyi . |
| 4,212,303 | 7/1980 | Nolan . |
| 4,274,714 | 6/1981 | Okamura ................... 359/871 X |
| 4,368,868 | 1/1983 | Urban . |
| 4,500,063 | 2/1985 | Schmidt et al. ............... 248/475.1 |
| 4,609,171 | 9/1986 | Matsui . |
| 4,614,412 | 9/1986 | Cohen ........................ 359/872 X |
| 4,830,326 | 5/1989 | Schmidt et al. ............ 359/872 X |
| 5,005,963 | 4/1991 | Schmidt et al. . |
| 5,106,049 | 4/1992 | Schmidt et al. . |

*Primary Examiner*—Ramon O. Ramirez
*Assistant Examiner*—Korie H. Chan
*Attorney, Agent, or Firm*—Weintraub Duross & Brady

[57] ABSTRACT

A mirror mounting bracket for mounting mirror assemblies to truck or van type vehicles which have slanted front ends that extend at an angle from the windshield toward the ground. The mounting bracket includes a mounting member which is attached to the vehicle and a clamping member with a living hinge which receives and holds the mirror assembly. The mounting member accommodates the slanted front end of the vehicle while the clamping member positions the mirror assembly vertical to the ground.

16 Claims, 2 Drawing Sheets

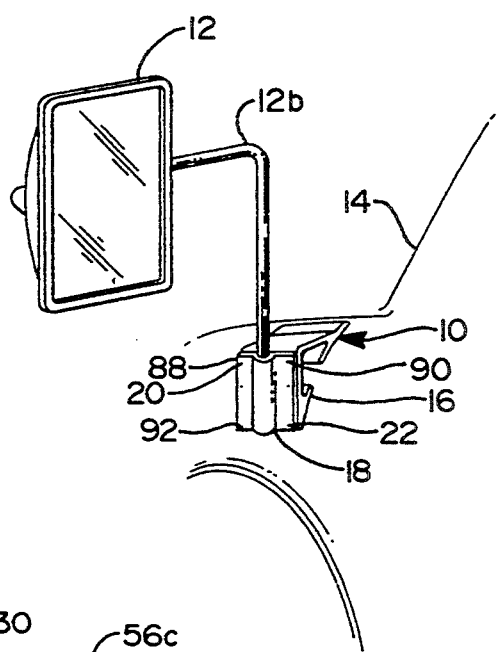
FIG 1
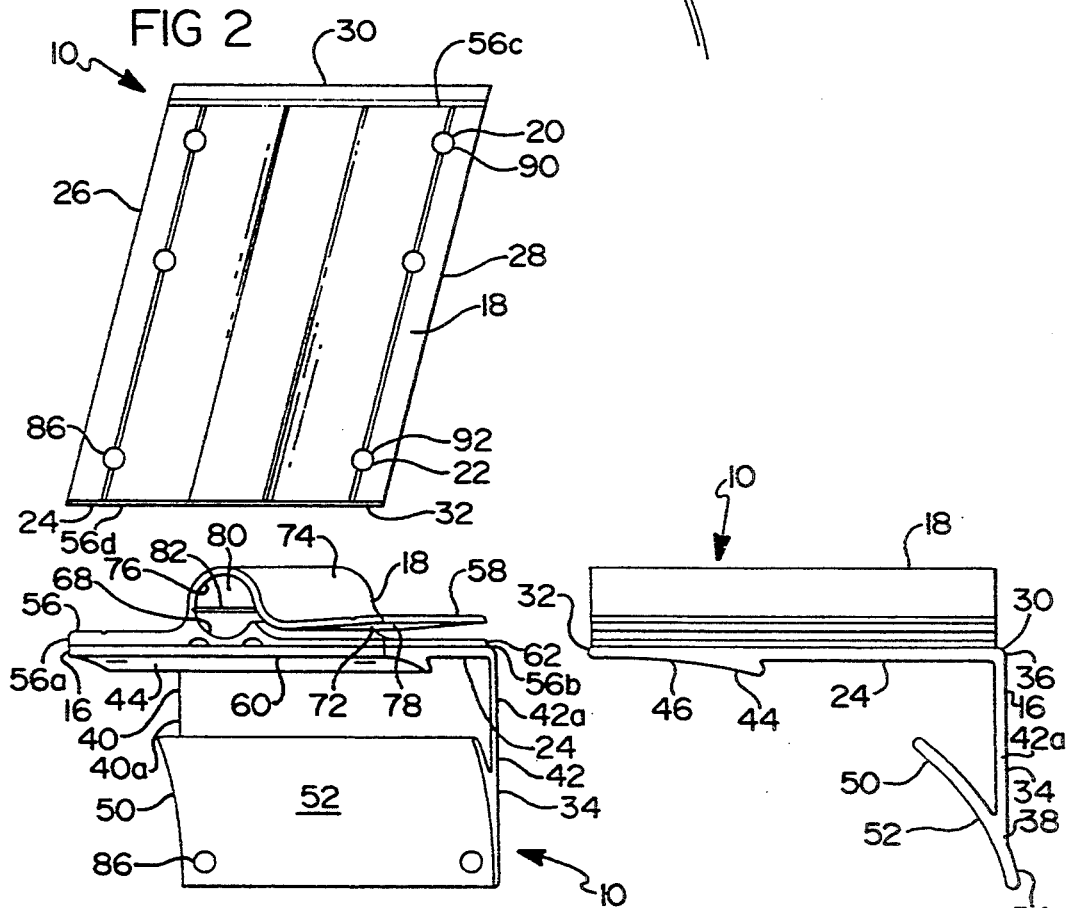
FIG 2
FIG 3
FIG 4

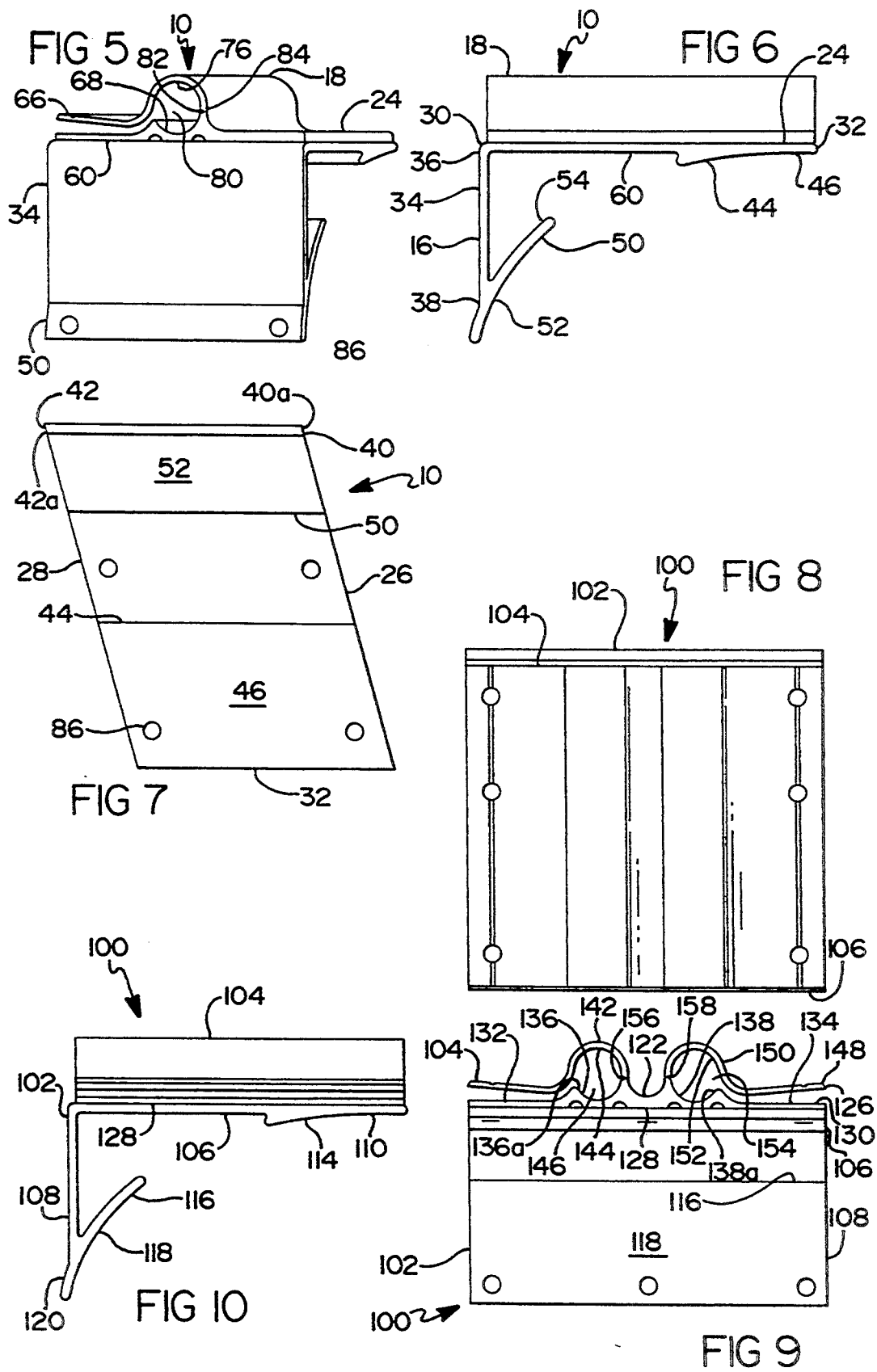

VEHICLE MOUNTING BRACKET FOR A MIRROR ASSEMBLY

CROSS-REFERENCE TO RELATED APPLICATIONS

This application is a continuation-in-part application of copending U.S. patent application Ser. No. 07/843,508, filed Feb. 28, 1992, now abandoned, and which as a continuation-in-part of U.S. patent application Ser. No. 07/419,213, filed Oct. 10, 1989, now U.S. Pat. No. 5,106,049, the disclosures of which are hereby incorporated by reference.

BACKGROUND OF INVENTION

1. Field of Invention

The present invention relates to mirror assembly mounting brackets. More specifically, the present invention relates to mirror assembly mounting brackets for vehicles with angled front fenders or similar surfaces.

2. Brief Description of Prior Art

Mirrors mounting mirror assemblies on vans and similar type vehicles is a well established art. Traditionally, the front fenders of vans and similar type vehicles are parallel to the ground with some variation in shape between the tops and sides of the fenders. Therefore, the only concern for the mounting of mirror assemblies is to have brackets which can accommodate the various shapes between the tops and sides of front fenders.

Typical of such mirror mounting devices is taught in U.S. Pat. No. 5,106,049. However, such mirror assembly mounting devices do not address the issue of angled front end vehicle designs, particularly in the modern vehicle van designs where the front portions of the vehicles are angled downwardly from the front windshield to the front bumper.

No portion of the front fender is parallel or normal to the ground. Thus, what is needed is a mirror assembly mounting bracket which accommodates the angular front end designs as well as the curved portions of the front fenders or front bodies while positioning the mirror assembly normal to the ground. This invention addresses the above described problems.

SUMMARY OF THE INVENTION

The mirror assembly mounting bracket of the present invention is attachable to an angled front end vehicle design comprises:
 (a) a mounting member, the mounting member comprising:
  (i) a first portion being a parallelogram having an angular upper and lower edge;
  (ii) a second portion integrally formed with and substantially normal to the first portion, the second portion intersecting the first portion in a plane contiguous with the upper edge;
 b) a clamping member, the clamping member securely attachable to the first portion of the mounting member, the clamping member corresponding to the first member, the clamping member preferably having a base portion and a cover portion cooperating to define a bore therebetween for receiving a support rod of the mirror assembly;
 c) means for attaching the cover portion of the clamping member to the base portion;
 d) means for attaching the clamping member to the mounting member; and
 e) means for attaching the mounting bracket to the vehicle.

The mirror assembly comprises mirrors having a type of support rod which the mirrors are mounted. The rod is inserted into a mounting bracket. In this case the support rod is insertable into the bore formed within the clamping member of the mounting bracket.

The mounting bracket may be mounted upon the forward slanted front end of a vehicle while positioning the tubular support rod and mirrors mounted thereto vertically relative to the road surface. The first portion of the mounting member preferably has a first mounting strut attached thereto. The second portion has a second mounting strut attached thereto. The mounting struts mount directly onto the vehicle.

The clamping member has a living hinge which permits the cover portion to open and close. The living hinge joints the base portion and the cover portion of the clamping member. The cover portion is rotated to open the bore so as to receive the support rod therein. Reversing the rotation of the cover portion closes to clamp the support rod in position in the bore. The cover portion is held in place over the support rod by the means for attaching the cover portion to the base portion.

The mounting member is generally L-shaped to accommodate the curved portions of the front fender or front end of the vehicle and is fastened to the vehicle by the means for attaching the mounting bracket.

The present invention will be better understood with reference to the following detailed discussion and to the accompanying drawings, in which like reference numerals refer to like elements and in which:

BRIEF DESCRIPTION OF THE DRAWINGS

FIG. 1 is a perspective view of a first embodiment of the mounting bracket and a mirror assembly shown mounted on the vehicle:

FIG. 2 is a front view of the first embodiment mounting bracket;

FIG. 3 is a bottom view of the preferred embodiment of the mounting bracket;

FIG. 4 is a side view of the preferred embodiment of the mounting bracket;

FIG. 5 is a plan view of the preferred embodiment of the mounting bracket;

FIG. 6 is a side view of the preferred embodiment of the mounting bracket;

FIG. 7 is a rear view of the preferred embodiment of the mounting bracket hereof;

FIG. 8 is a front view of a second embodiment;

FIG. 9 is a bottom view of the second embodiment; and

FIG. 10 is a side view of the alternative embodiment.

DETAILED DESCRIPTION OF THE INVENTION

Now with reference to the drawings and, in particular, FIGS. 1-7, there is depicted a first embodiment of a mounting bracket in accordance with the present invention, generally denoted as 10, for mounting a mirror assembly 12 to a vehicle 14 which has a front end that is angled or slanted toward the ground. The mounting bracket 10 comprises a mounting member 16, a clamping member 18, means 20 for attaching the clamping member 18 to the mounting member 16 and means 22 for attaching the mounting bracket 10 to the vehicle 14.

As shown in FIG. 1, the mounting bracket 10 attaches to the front fender or front end of the vehicle 14. The front end of the vehicle 14 is generally slanted or angled toward the ground. For the purposes of this description, the mirror assembly 12 comprises a mirror and a support rod 12b.

The mounting bracket 10 of this invention positions the mirror assembly 12 vertically relative to the ground while accommodating the slanted or angled front end of the vehicle 14.

In the preferred embodiment, the mounting member 16 is substantially L-shaped, as shown. The mounting member 16 comprises a first portion 24. The first portion 24 is a polygon, preferably a parallelogram, with a first side 26 and an opposing parallel second side 28. The first portion 24 also has an upper edge 30 and an opposing parallel lower edge 32. The top end 30 and bottom end 32 preferably extend at an acute angle from the first side 26 to the second side 28.

The mounting member 16 further comprises a second portion 34. The second portion 34 is substantially normal to the first portion 24. The second portion 34 intersects the first portion 24 in a plane contiguous with the upper edge 30. The second portion 34 has a front end 36 and an opposing parallel rear end 38 with the front end 36 being integrally formed with the upper edge 30 of the first portion 24. The second portion 34, also, has a third side 40 and an opposing parallel fourth side 42. The third side 40 and the fourth side 42 are substantially normal to the front end 36 and the rear end 38.

The first portion 24 has a first mounting strut 44 attached thereto proximate the bottom end 32. The first mounting strut 44 corresponds in shape with the first portion 24. The first mounting strut 44 has a first mounting surface 46. The first mounting surface 46 is preferably an arcuate concave surface which seats on a first curved surface of the vehicle 14. The first mounting strut 44 may be integrally formed with the first portion 24 or may be attached by welding or the like.

The second portion 34 has a second mounting strut 50 attached thereto proximate the rear end 38. The second mounting strut 50 corresponds in shape to the first mounting strut 44 and the first portion 24. The second mounting strut 50 has a second mounting surface 52 and a second back surface 54. The second mounting surface 52 is preferably an arcuate concave surface which seats on a second curved surface of the vehicle 14 with the second back surface 54 being parallel with the second mounting surface 52. The second back surface 52 of the second mounting strut 50 is integrally formed with or may be attached to the rear end 38 of the second portion 34 by welding or the like.

The clamping member 18 disposed on the first portion 24 of the mounting member 16 is a polygon corresponding in shape to the first portion 24. The clamping member 18 preferably comprises a base portion 56 and a clamping portion 58. Alternatively, the clamping member 18 may use the first portion 24 as a base for clamping.

The base portion 56 is attachable to the first portion 24 of the mounting member 16 by means for attaching the clamping member 18, such as fasteners, or by welding. The base portion 56 has a first side 56a and an opposing parallel second side 56b and a first end 56c and an opposing parallel second end 56d. The first end 56c and second end 56d extend at an angle between the first side 56a and the second side 56b. The base portion 56, also, has a mounting surface 60 and a clamping surface 62. The clamping surface 62 of the base portion 56 has a first cavity 68 formed therein between the first side 56a and the second side 56b for seating the support rod 12b. The first cavity 68 extends from the first end 56c to the second end 56d. The first cavity 68 is, in the preferred embodiment, concave.

The clamping portion 58 is integrally formed with and attached to the base portion 56. The clamping portion 58 is generally a polygon corresponding to the base portion 56. The cover portion 58 has a cover portion 64 and an integral fastening portion 66 parallel to the cover portion 64. The clamping portion 58 has a bottom surface 72 and a top surface 74. The bottom surface 72 of the cover portion 64 has a second cavity 76 formed therein and an integral flat portion 78 parallel thereto corresponding to the fastening portion 66. The second cavity 76 is preferably concave and corresponds to and is aligned with the first cavity 68 of the base portion 56. The top surface 74 of the clamping portion 58 is parallel to and corresponds to the bottom surface 72. The first cavity 68 of the base portion 56 and the second cavity of the clamping portion 58 cooperate to form a bore 80 therebetween to receive and hold a support rod 12b.

The clamping member 18 of the mounting bracket 10 has a living hinge 82 located at the intersection of the cover portion 64 and the clamping surface 62 of the base portion 56. The living hinge 82 is defined by a V-slot 84 formed at the intersection. The living hinge 82 permits the clamping member 18 to open to receive the support rod 12b and close to hold the support rod 12b in position.

The mounting bracket 10 has a plurality of apertures 86, formed therein to provide for attaching the cover portion 58 to the base portion 56 and attaching the mounting bracket 10 to the vehicle 14.

The means 88 for fastening the cover portion 58 to the base portion 56 is preferably a first fastener 90, such as a threaded screw or the like. The first fastener 90 is insertable through the aperture in the cover portion 58 and through the aperture 86 in the base portion 56 and mounting member 16. The first fastener 90 may also be insertable through the vehicle 14. The fasteners are placed and tightened to secure the cover portion in a closed or clamping position over the support rod 12b.

The means 22 for attaching the mounting bracket 14 to the vehicle is preferably a second fastener 92 such as a threaded screw and a threaded nut (not shown). The second fasteners 92 are insertable through the apertures 86 in the mounting member 16 into the vehicle 14. The second fasteners are placed and tightened to secure the mounting bracket 10 in place on the vehicle.

As shown in FIGS. 8 and 9, a second embodiment of the invention is a dual mirror assembly mounting bracket 100 comprising a mounting member 102 and a dual mirror clamping member 104. The dual mirror mounting bracket 100 provides for two mirror assemblies to be mounted to the vehicle (not shown) at the same time.

The mounting member 102 of dual mirror mounting bracket 100 is generally L-shaped, comprising a first portion 106 and a second portion 108 substantially normal to the first portion 106. The first portion 106 of the mounting bracket 100 is a polygon, but may be a parallelogram, as described in the first embodiment and as shown in FIGS. 2, 3, 5 and 6. The first portion 106 has an angular upper edge 106b and a lower edge 106b parallel with the upper edge. The second portion 108 is integrally formed with the first portion 106. The second portion 108 intersecting the first portion in a plane contiguous with the upper edge.

The first portion 106 has a first strut 110 attached thereto. The first strut 110 is generally shaped to correspond to the shape of the first portion 106. The first strut 110 has a first mounting surface 114 for mounting to a first surface of the vehicle.

The second portion 108 has a second mounting strut 116 attached thereto. The second mounting strut 116 is generally shaped to correspond to the shape of the first portion 106. The second mounting strut 116 has a second mounting surface 118 for mounting to a second surface of the vehicle and an opposing surface 120 parallel to the second mounting surface 118.

The dual mirror clamping member 104 is disposed upon the first portion 106 of the mounting member 102. The clamping member 104 is generally shaped to correspond to the shape of the first portion 106. As shown in FIGS. 8-10, the dual mirror clamping member 104 preferably comprises a base portion 122, a first clamping portion, and an parallel second clamping portion 126. Alternatively, the clamping member 104 may use the first portion 106 as a base for clamping. The clamping member 104 receives and holds two support rods for mirror assemblies (not shown).

The base portion 122 of the dual mirror clamping member 104 has a mounting surface 128 and a clamping surface 130. The clamping surface 130 has a first fastening surface 132 and a parallel second fastening surface 134. The clamping surface 130 has a first seat 136 integrally connected to the first fastening portion 132 with a first cavity 136a formed therein, and a parallel second seat 138 integrally connected to the second fastening portion 134 with a second cavity 138a formed therein. The cavities 136a, 138a receive the support rods of the mirror assemblies. The first and second cavities 136a, 138a are preferably concave.

The first clamping portion has a first connecting portion 140 and an integrally connected first cover portion 142. The first connecting portion 140 urges against the first fastening portion of the base portion 122 when the clamping portion 140 is closed. The first cover portion 142 has a third cavity 144 formed therein aligned with and corresponding to the first cavity 136a of the base portion 122. The third cavity 144 is preferably concave. The first cover portion 142 and the first seat 136 cooperate to define a first bore 146 for holding a support rod 12b when the first clamping portion is closed.

The second clamping portion 126 has a second connecting portion 148 and an integrally connected second cover portion 150. The second connecting portion 148 urges against the second fastening portion 134 of the base portion 122 when the clamping portion 126 is closed. The second cover portion 150 has a fourth cavity 152 formed therein aligned with and corresponding to the second cavity 138a of the base portion 122. The fourth cavity 152 is preferably concave. The second cover portion 150 and the second seat 138 cooperate to define a second bore 154 when the second clamping portion 126 is closed.

The dual mirror clamping member 104 has a first living hinge 156 disposed at the intersection of the first clamping portion and the clamping surface 130 of the base portion 122. A second living hinge 158 is disposed at the intersection of the second clamping portion 126 and the clamping surface 130 of the base portion 122.

The first living hinge 156 and the second living hinge 158 are similar to the living hinge 82 previously described in detail in the first embodiment. The living hinges 156, 158 permit the clamping portions 126 to be opened and closed.

This embodiment of the mounting bracket 100, in the alternative, may have a mounting member 102 that has a rectangular first portion 106, as shown in FIGS. 8 and 9. This embodiment of the mounting bracket 100 may be used with standard vehicle front ends.

A means 160 for attaching the clamping member 104 to the mounting member 102; means for attaching the first clamping portion and the second clamping portion 126 to the base portion 122; and means for attaching the dual mirror mounting bracket 100 to the vehicle 14 are similar to and described in detail by the first embodiment of the mounting bracket.

In use, in the two embodiments, the second mounting strut 50 of the mounting bracket 10 is attached to the vehicle 14 via means 22 for attaching the mounting bracket 10. The support rod 12b of the mirror assembly 12 is seated in the cavity 63 of the base portion 56. The cover portion 58 is attached to the base portion 56 and the vehicle 14 via means 88 for attaching the cover portion clamping the support rod 12b in a desired position. The mirror 120 is then adjusted to a desired position.

The mounting bracket 10 of the first embodiment of the invention permits the mounting of a mirror assembly in a vertical position to the road on vehicles with front ends that slant from the windshield to the front bumper. The second embodiment of the invention provides for a mounting bracket 100 which mounts two mirror assemblies vertical to the road. This increases the area to be viewed via the mirrors.

Having, thus, described the present invention, what is claimed is:

1. A mirror mounting bracket for mounting a mirror assembly having a support rod to a vehicle, the mounting bracket comprising:
   (a) a mounting member comprising:
      (1) a first portion being a parallelogram having an angular upper edge and an angular lower edge;
      (2) a second portion unitarily formed with and substantially normal to the first portion, the second portion intersecting the first portion in a plane contiguous to the upper edge;
   (b) a clamping member attached to the first mounting member, the clamping member clamping the support rod thereto; and
   (c) means for attaching the mounting bracket to the vehicle.

2. The mirror mounting bracket of claim 1, further comprising:
   (a) a first mounting strut unitarily formed to the first portion; and
   (b) a second mounting strut unitarily formed to the second portion.

3. The mirror mounting bracket of claim 1, wherein the clamping member comprises:
   (a) a base portion, the base portion having a first cavity formed therein, and
   (b) a clamping portion, the clamping portion having a second cavity formed therein corresponding to the first cavity in the base portion, the clamping portion and the base portion cooperating to define a bore therebetween for receiving and holding the support rod.

4. The mirror mounting bracket of claim 2, the first strut further comprising:
a first mounting surface being curvilinear for mounting to a first surface of the vehicle, the first mounting surface overlying and having the same configuration as the first surface.

5. The mirror mounting bracket of claim 4, the second mounting strut further comprising:
a second mounting surface and an opposing connecting surface, the mounting surface being concave for mounting on a second surface of the vehicle, the connecting surface corresponding to and being parallel to the mounting surface.

6. The mirror mounting bracket of claim 1, the clamping member further comprising:
(a) a base portion having a mounting surface and a clamping surface, the mounting surface disposed upon the first portion of the mounting member, the clamping surface having a fastening portion and a seating portion, the seating portion having a first cavity formed therein;
(b) a clamping portion having a connecting portion and a cover portion, the connecting portion urging against the fastening portion of the base portion when the clamping member is closed, the cover portion having a second cavity formed therein, corresponding to the cavity of the seating portion, the cover portion integrally connected to the clamping surface of the base portion; and
wherein the clamping portion and the base portion cooperate to form a bore therethrough to receive and hold the support rod.

7. The mirror mounting bracket of claim 6, the clamping member further comprising:
a hinge disposed proximate the intersection of the cover portion and the base portion.

8. The mirror mounting bracket of claim 1, further comprising: means for attaching the clamping member to the mounting member.

9. The mirror mounting bracket of claim 1, the clamping member attached to the mounting member for clamping a second mirror support thereto.

10. A dual mirror mounting bracket for mounting mirror assemblies to a vehicle, the dual mirror mounting assembly having a first support rod and a second support rod and comprising:
(a) a mounting member, the mounting member having a vertical first portion and a unitarily formed second portion substantially normal to the first portion, the first portion having a first mounting strut unitarily formed thereto for mounting on a first surface of the vehicle, the second portion having a second mounting strut unitarily formed thereto for mounting on a second surface of the vehicle;
(b) a clamping member securely attaching to the first portion of the mounting member, the the clamping member having a base portion, a first clamping portion and a second clamping portion, the second clamping portion being substantially parallel to the first clamping portion, the first clamping portion and the base portion cooperating to define first bore there between for receiving and holding the first support rod, the second clamping portion and the base portion cooperating to define a second bore there between for receiving and holding the second support rod; and
(c) means for removably attaching the mounting bracket to the vehicle.

11. The dual mirror mounting bracket of claim 10, wherein the first portion of the mounting member is a parallelogram.

12. The dual mirror mounting bracket of claim 10, wherein the first portion of the mounting member is a rectangle.

13. The mirror mounting bracket of claim 10, the first strut further comprising:
a first mounting surface being curvilinear for mounting to a first surface of the vehicle, the first mounting surface overlying and having the same configuration as the first surface.

14. The mirror mounting bracket of claim 10, the second mounting strut further comprising:
a second mounting surface being curvilinear for mounting on a second surface of the vehicle, the connecting surface overlying and having the same configuration as the mounting surface.

15. The mirror mounting bracket of claim 10, the clamping member further comprising:
(a) a base portion having a mounting surface and a clamping surface, the mounting surface disposed upon the first portion of the mounting member, the clamping surface having a first fastening portion and an opposing parallel second fastening portion, and a first seating portion and a parallel second seating portion, the first seating portion having a first cavity formed therein, the second seating portion having a second cavity formed therein;
(b) a first clamping portion having a first connecting portion and a first cover portion, the first connecting portion urging against the first fastening portion when the first clamping portion is closed, the first cover portion having a third cavity formed therein, corresponding to the first cavity of the base portion, the first cover portion integrally connected to the clamping surface of the base portion;
(c) a second clamping portion having a second connecting portion and a second cover portion, the second connecting portion urging against the second fastening portion when the second clamping portion is closed, the second cover portion having a fourth cavity formed therein, corresponding to the second cavity of the base portion, the second cover portion integrally connected to the clamping surface of the base portion; and
wherein the first and second clamping portion and the base portion cooperate to receive and hold the two support rods.

16. The mirror mounting bracket of claim 10 the clamping member further comprising:
(a) a first clamping portion having a first hinge proximate the intersection of the first clamping portion and the clamping surface of the base member; and
(b) a second clamping portion having a second hinge proximate the intersection of the second clamping portion and the clamping surface of the base member.

* * * * *